US010307703B1

(12) United States Patent
Dearden

(10) Patent No.: US 10,307,703 B1
(45) Date of Patent: Jun. 4, 2019

(54) AIR FILTER HOUSING

(71) Applicant: Daniel M. Dearden, Bountiful, UT (US)

(72) Inventor: Daniel M. Dearden, Bountiful, UT (US)

(*) Notice: Subject to any disclaimer, the term of this patent is extended or adjusted under 35 U.S.C. 154(b) by 0 days.

(21) Appl. No.: 15/955,937

(22) Filed: Apr. 18, 2018

(51) Int. Cl.
*B01D 46/00* (2006.01)
*B01D 46/12* (2006.01)

(52) U.S. Cl.
CPC ......... *B01D 46/125* (2013.01); *B01D 46/002* (2013.01); *B01D 46/0004* (2013.01); *B01D 2265/028* (2013.01); *B01D 2265/06* (2013.01)

(58) Field of Classification Search
CPC ...... B01D 46/00; B01D 46/12; B01D 46/125; B01D 46/004; B01D 46/002; B01D 2265/028; B01D 2265/06
USPC ..................................................... 55/482–489
See application file for complete search history.

(56) References Cited

U.S. PATENT DOCUMENTS

| | | | |
|---|---|---|---|
| 4,331,459 A | 5/1982 | Copley | |
| 4,904,282 A | 2/1990 | Stuble et al. | |
| 5,120,919 A | 6/1992 | Bruges | |
| 6,902,603 B2 | 6/2005 | Wiser et al. | |
| 6,955,696 B1 | 10/2005 | Ost et al. | |
| 8,425,644 B2 | 4/2013 | Sundvik et al. | |
| 8,747,505 B2 | 6/2014 | Crabtree et al. | |
| 8,753,414 B2 | 6/2014 | Gebert | |
| 8,926,725 B2 | 1/2015 | Loken et al. | |
| 9,126,135 B2 | 9/2015 | Crabtree et al. | |
| 9,623,356 B2 | 4/2017 | Gorman | |
| 2004/0144254 A1* | 7/2004 | Wiser, III | B01D 46/0005 96/66 |
| 2010/0251680 A1* | 10/2010 | Suzuki | B01D 46/0005 55/483 |
| 2011/0277430 A1* | 11/2011 | Nicholas | B01D 46/0005 55/483 |

FOREIGN PATENT DOCUMENTS

| | | |
|---|---|---|
| EP | 0951335 B1 | 5/2003 |
| EP | 1749562 B1 | 11/2012 |

OTHER PUBLICATIONS

DL6000 Dust Collector Operating Manual, National Flooring Equipment, date unknown (see "Date Information" section below for more information) (22 pp.).
Newell, D.A., Interpreting Filter Performance, HPAC Engineering, Feb. 2006 (8 pp.).
Perfect 16 Installation Manual, MERV16 Micro-Particle Filtration System, IQAir North America, Inc., pdf file created on Feb. 19, 2015 (12pp.).
Residential Air Cleaners, Second Edition, United States Environmental Protection Agency (EPA), Aug. 2009 (36 pp.).
Zehnder ComfoAir 350, Feb. 27, 2015 (8 pp.).

\* cited by examiner

*Primary Examiner* — T. Bennett McKenzie
(74) *Attorney, Agent, or Firm* — Holland & Hart, LLP

(57) ABSTRACT

An air filter housing includes an air inlet opening, an air outlet opening, and at least four filter bays each of which is configured to receive and hold a filter. The at least four filter bays form a V shape in the air filter housing and each side of the V shape includes at least two of the at least four filter bays. The air filter housing can be used in an air filtration system such as a residential HVAC system to achieve a MERV 16 filtration rating.

23 Claims, 14 Drawing Sheets

AIR FILTER HOUSING

BACKGROUND

Indoor air pollution increasingly poses a greater health risk than outdoor air pollution. A growing body of evidence indicates that the air in homes and other buildings is more polluted than outdoor air in even the largest and most industrialized cities. This is a major source of concern considering that people spend approximately 90 percent of their time indoors.

People who are exposed to indoor air pollutants for the longest periods of time are often those most susceptible to the effects of indoor air pollution. Such groups include the young, the elderly, and the chronically ill, especially those suffering from respiratory or cardiovascular disease.

One way to address the problems associated with indoor air pollution is to clean or filter the air to reduce pollutant levels. There are many types and sizes of air filtration systems on the market, ranging from relatively inexpensive table-top models to sophisticated, expensive whole-home systems. The effectiveness of these systems varies widely. Some filtration systems are highly effective, while others, including most table-top models, are much less so.

The effectiveness of an air filtration system can be determined by how well it collects particulates from indoor air (expressed as a percentage efficiency rate) and how much air it draws through the cleaning or filtering element (expressed in cubic feet per minute). A system having an efficient filter with a low air-circulation rate will not be effective, nor will a system having a high air-circulation rate with an inefficient filter.

Conventional air filtration systems suffer from a number of problems, especially whole home air filtration systems that are part of a structure's heating, ventilating, and air-conditioning (HVAC) system. One problem is that there is often limited space for the air filtration system. This is especially a problem for high efficiency air filtration systems such as those that are rated at MERV 13 and higher. An example of such a system is the IQ Perfect 16.

High efficiency systems such as the IQ Perfect 16 often have unusual and non-standard shapes that are required to achieve high efficiency filtration but make them difficult to install in the limited space available for the HVAC system. Systems such as these must also be adapted to attach to conventional ductwork commonly used for HVAC systems, which requires significant time and labor.

Another problem with conventional air filtration systems is that they often have limited space for the filters. This is especially true for those systems that are sized the same or similarly to conventional ductwork used by the HVAC system. These systems can often only hold a single air filter or sometimes two. It would be desirable to have a system that holds more air filters and can be easily installed in conventional ductwork.

SUMMARY

An air filter housing is disclosed that can be easily incorporated into conventional ductwork used by HVAC systems and especially the ductwork used for residential HVAC systems. The air filter housing includes an air inlet opening, an air outlet opening, and a plurality of filter bays. Each of the filter bays is configured to receive and hold an air filter. The air filters can be inserted into the filter bays through the filter bay openings in the side of the air filter housing. A door is used to cover and seal the filter bay openings when the air filter housing is in use.

The air filter housing can include at least four filter bays where each filter bay is configured to receive and hold a separate air filter. The filter bays can be arranged in a V shape in the air filter housing. Each side of the V shape includes at least two of the filter bays. In one embodiment, the air inlet opening is on a top side of the air filter housing, the air outlet opening is on a bottom side of the housing, and the filter bays are accessible from a front side of the housing.

The air filter housing can be oriented in any suitable direction. For example, in one embodiment, the air filter housing is upright and the filter bays are oriented so the V-shape is right side up. In another embodiment, the air filter housing is also upright but the filter bays are oriented so that the V shape is upside down—i.e., the pointed or narrow side is at the top and the open or wide side is at the bottom. In yet other embodiments, the air filter housing is positioned on its side and the filter bays can be oriented so that the V shape points to the left or to the right. In all of these embodiments, the air can flow through the air filter housing in either direction—i.e., the air can enter on the open side of the V shape or the air can enter on the pointed side of the V shape (the filters should be oriented to correctly depending on the direction of air flow).

The air filter housing can be part of a whole home or building air filtration system. For example, the air filter housing can be installed in the ductwork of the home's central heating, ventilating, and air-conditioning (HVAC) system to clean the air in the entire house. In one embodiment, the air filtration system can have a MERV rating of at least 13 and preferably 16 while still being capable of producing a high air flow rate and low pressure drop across the air filter housing.

The air filter housing can hold a variety of air filters including mechanical air filters configured to remove particles from the air and/or gas phase air filters configured to remove gaseous pollutants from the air through adsorption and the like. Of course, it should be appreciated that the air filter housing can hold air filters that remove both particles and gaseous pollutants and, thus, can be considered both a mechanical air filter and a gas phase air filter.

One or more representative embodiments is provided to illustrate the various features, characteristics, and advantages of the disclosed subject matter. The embodiments are provided in the context of an air filter housing for a residential HVAC system. It should be understood, however, that many of the concepts can be used in a variety of other settings, situations, and configurations. For example, the features, characteristics, advantages, etc., of one embodiment can be used alone or in various combinations and sub-combinations with one another.

The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which.

DETAILED DESCRIPTION

Figure 1:
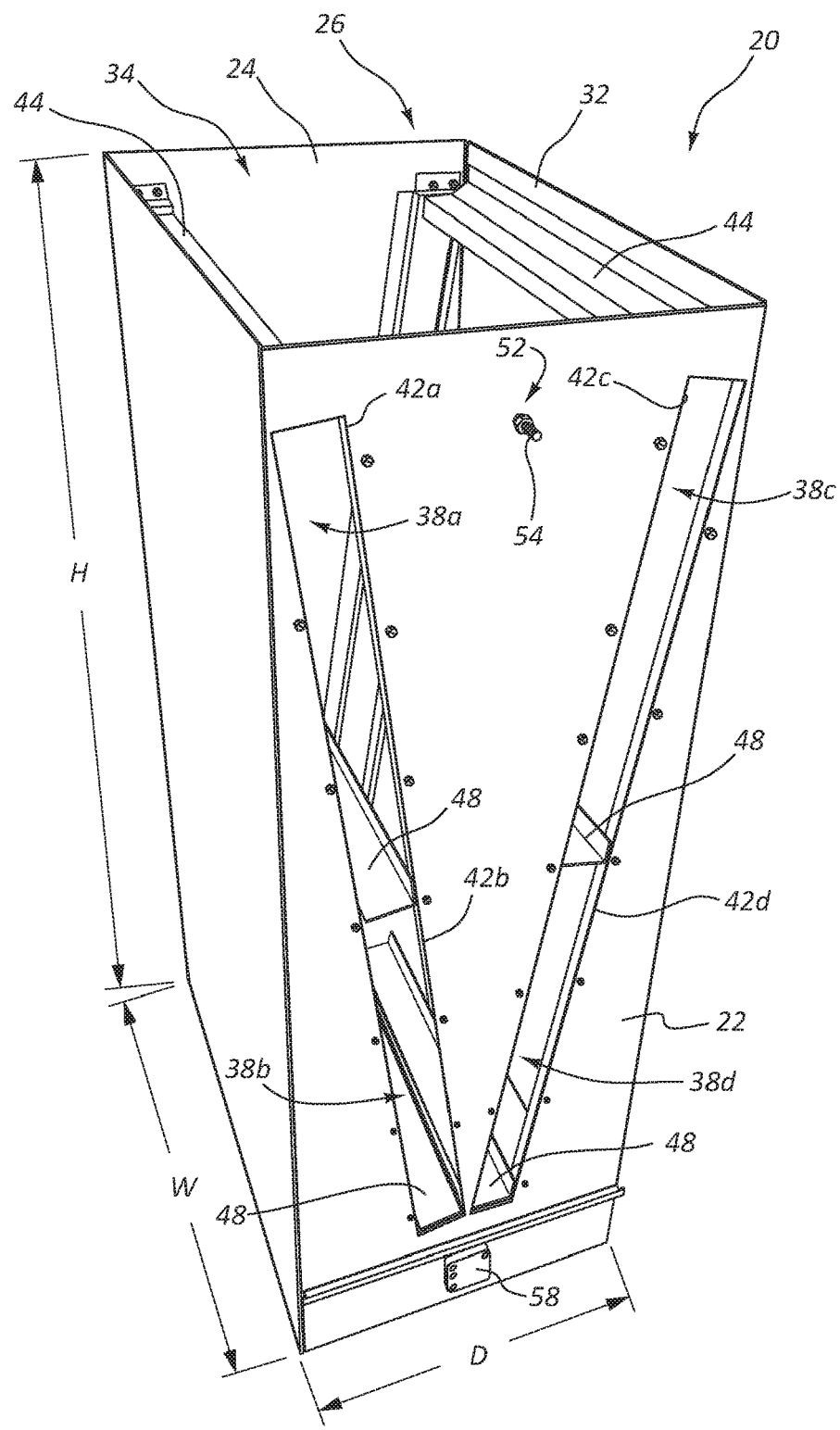
FIG. 1 is a front perspective view of one embodiment of an air filter housing.
Figure 2:
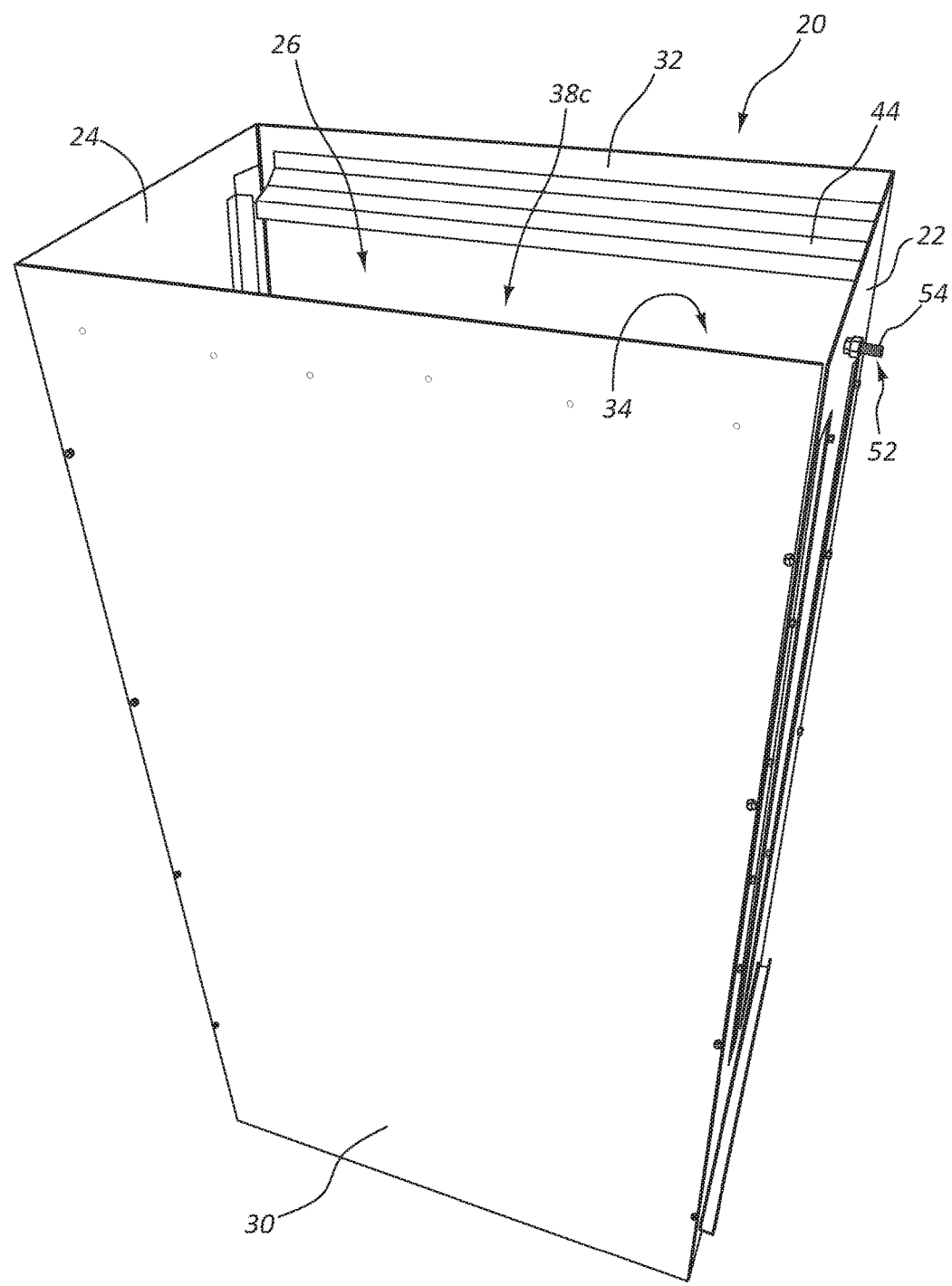
FIG. 2 is a left side perspective view of the air filter housing in FIG. 1.
Figure 3:
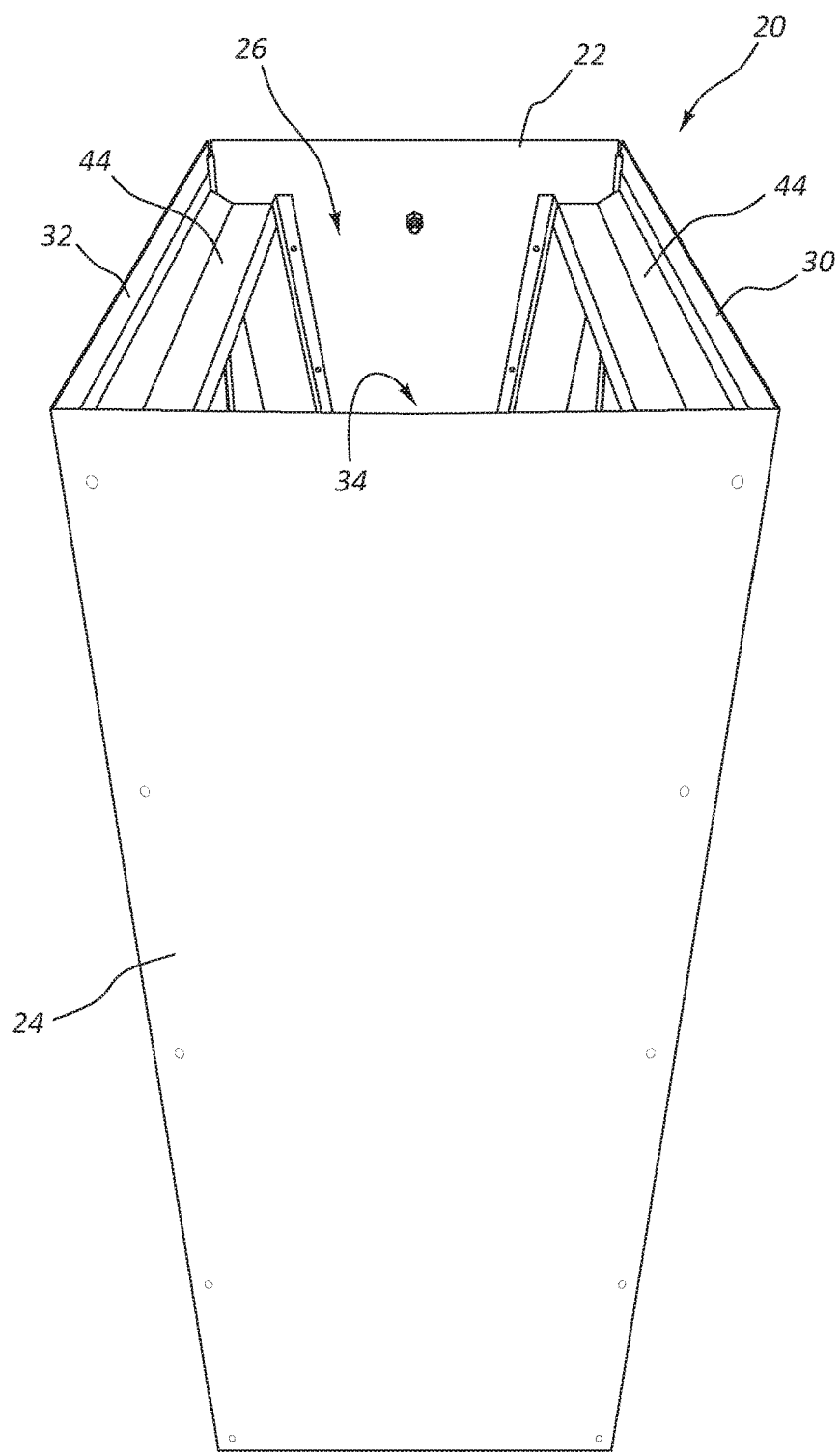
FIG. 3 is a rear perspective view of the air filter housing in FIG. 1.
Figure 4:
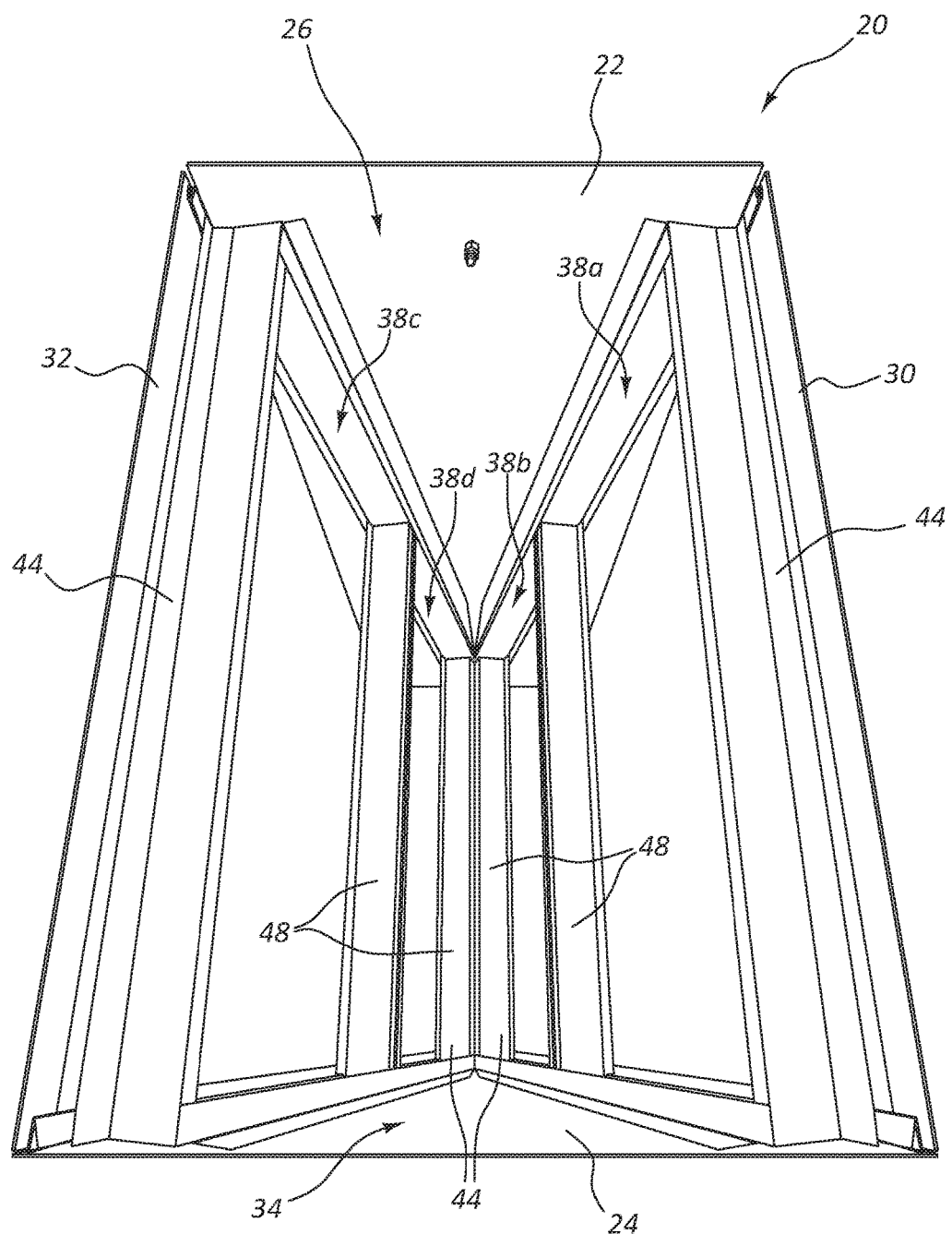
FIGS. 4-5 are top perspective views of the air filter housing in FIG. 1.
Figure 5:
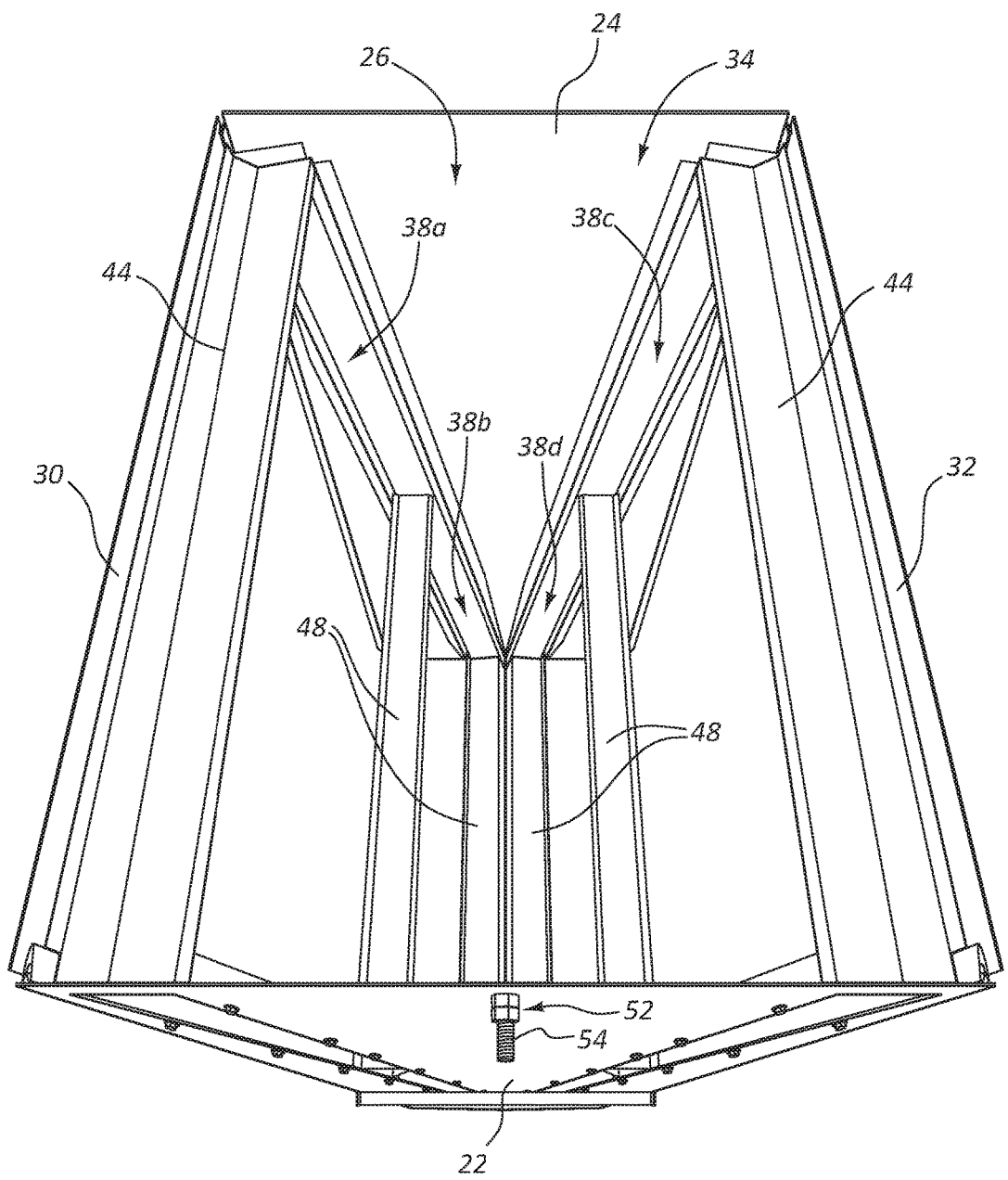
Figure 6:
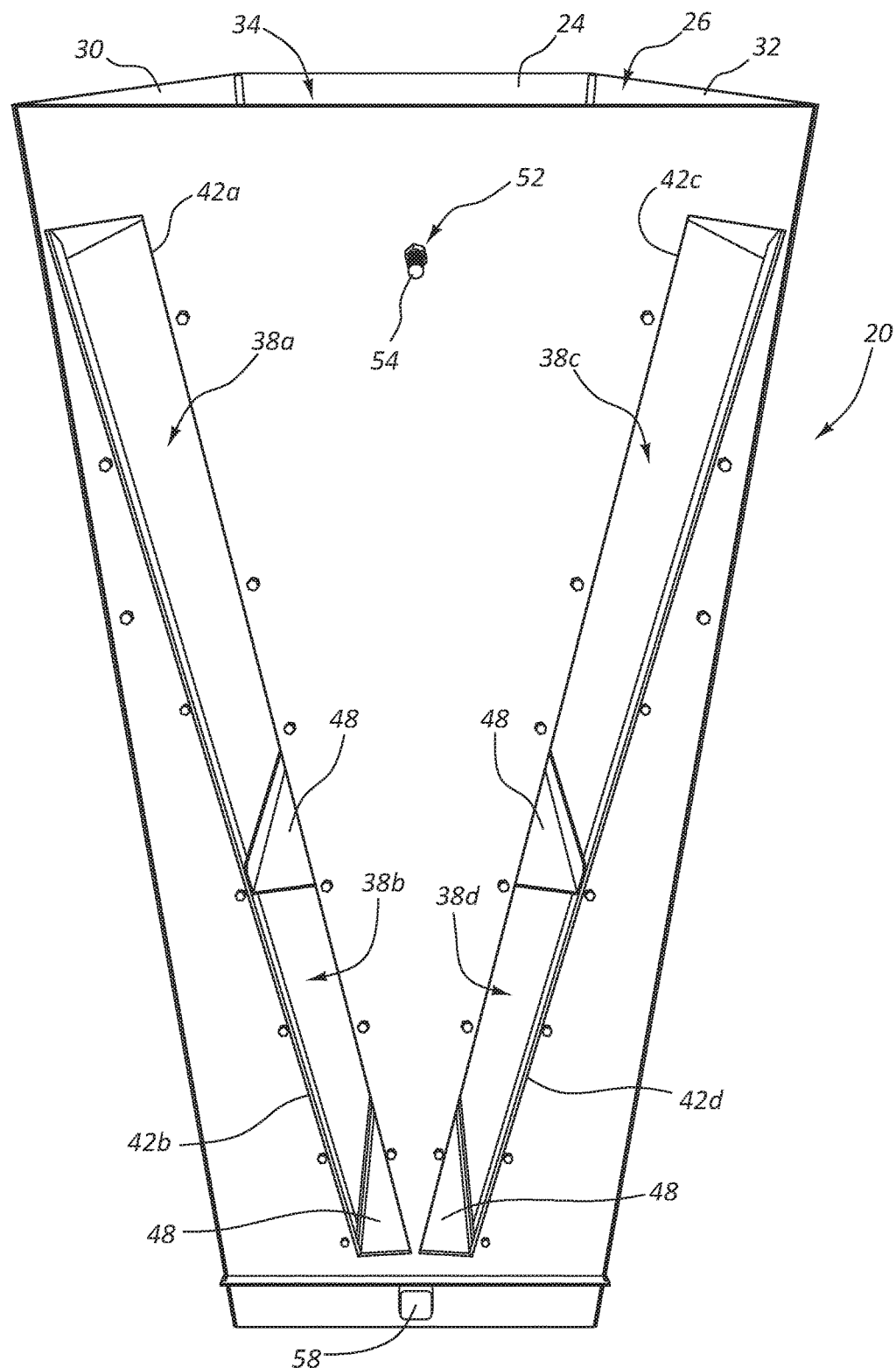
FIG. 6 is a front perspective view of the air filter housing in FIG. 1.
Figure 7:
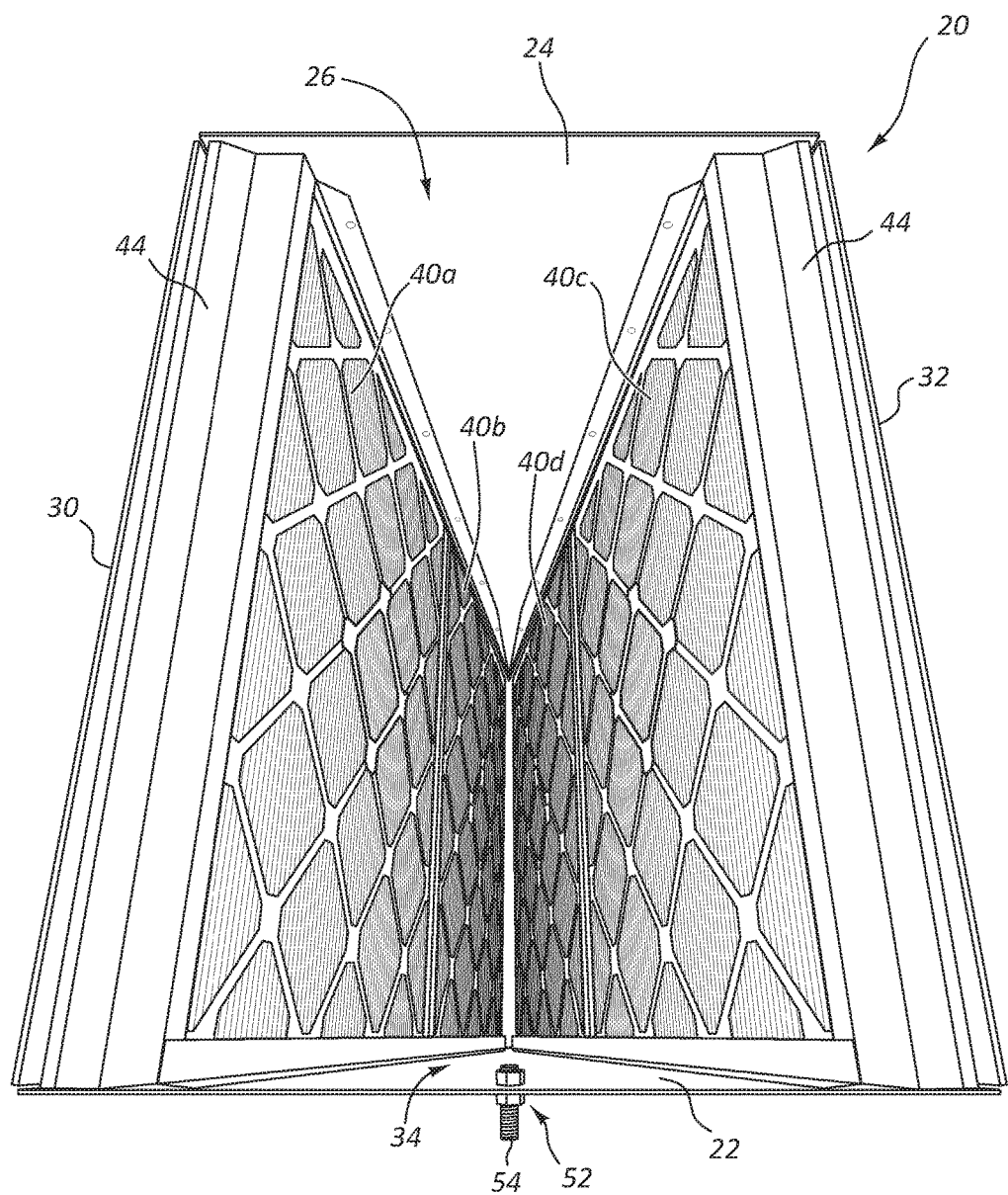
FIG. 7 is a top perspective view of the air filter housing in FIG. 1 holding four MERV 16 rated air filters.
Figure 8:
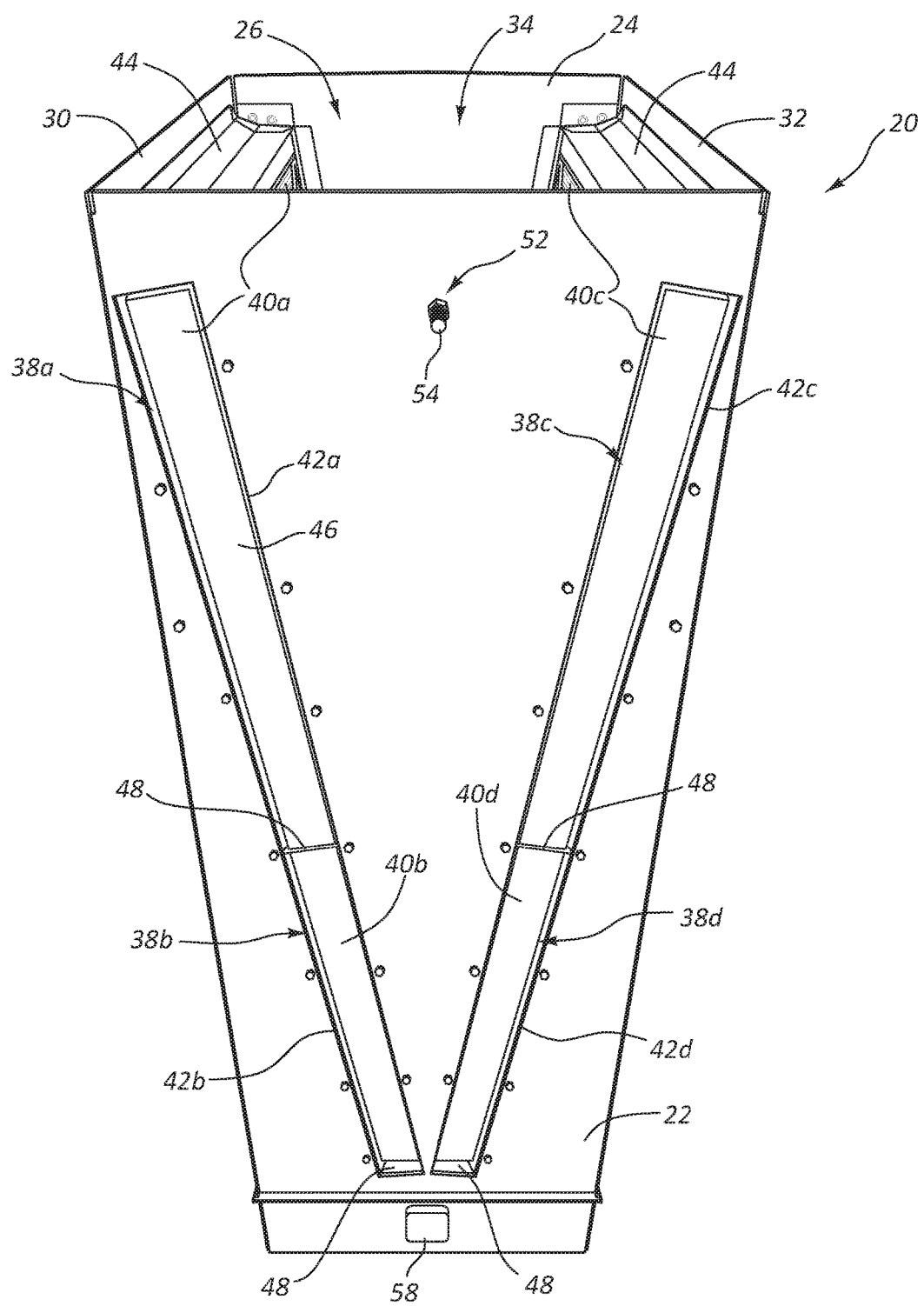
FIG. 8 is a front perspective view of the air filter housing in FIG. 7.
Figure 9:
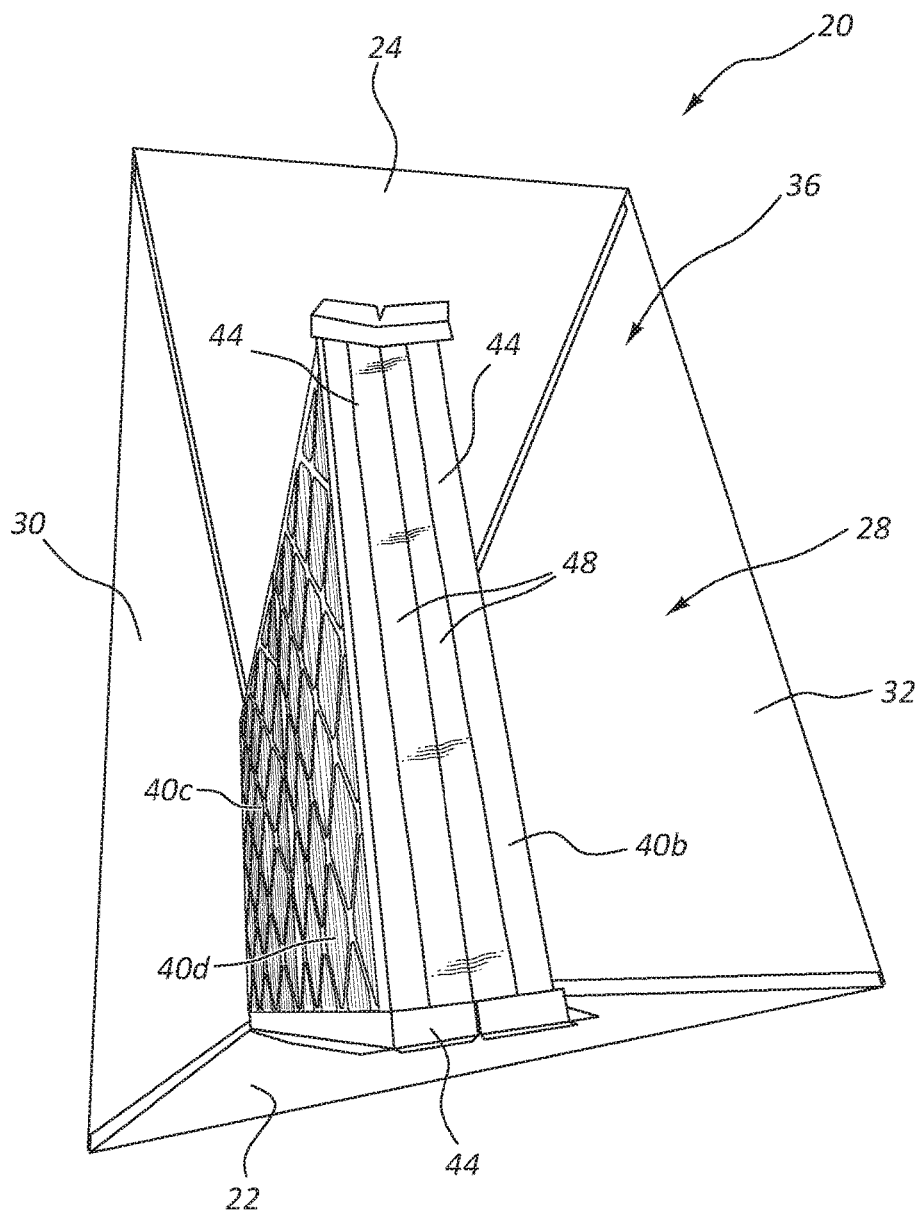
FIGS. 9-10 are bottom perspective views of the air filter housing in FIG. 7.
Figure 10:
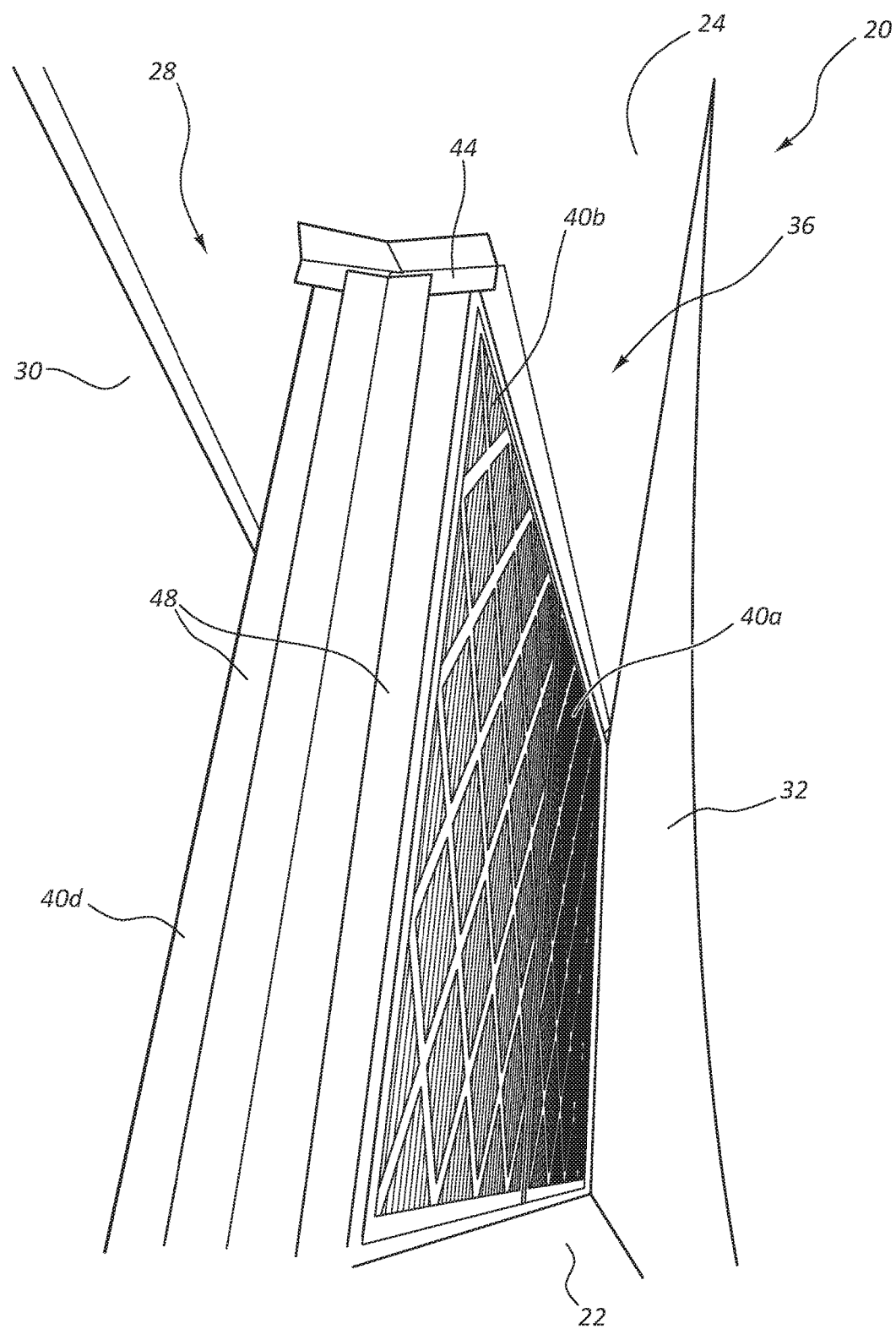

Referring to FIGS. 1-6, an air filter housing or filter cabinet 20 comprises a top side 26 (alternatively referred to as a first side or a top end), a bottom side 28 (alternatively referred to as a second side or a bottom end), a front side 22 (alternatively referred to as a third side or a first sidewall), a rear side 24 (alternatively referred to as a fourth side or a rear sidewall), a left side 30 (alternatively referred to as a fifth side or a left sidewall), and a right side 32 (alternatively referred to as a sixth side or right sidewall).

The air filter housing 20 includes an air inlet opening 34 in the top side 26, an air outlet opening 36 in the bottom side 28, and a plurality of filter bays 38a, 38b, 38c, 38d (collectively filter bays 38) configured to hold corresponding air filters 40a, 40b, 40c, 40d (collectively air filters 40). The air inlet opening 34 and the air outlet opening 36 are in fluid communication with each other. This means that air flows through the air filter housing 20 from one opening 34, 36 to the other opening 34, 36. The filters 40 are positioned between the openings 34, 36 so that the air traveling from one opening 34, 36 must pass through the filters 40 to reach the other opening 34, 36.

The air inlet opening 34 and the air outlet opening 36 are positioned on opposite sides of the air filter housing 20. It should be appreciated that the openings 34, 36 can be positioned anywhere on the air filter housing 20 and need not be positioned opposite from each other in the manner shown in the Figs.

The air inlet opening 34 and the air outlet opening 36 can have any suitable shape. For example, the openings 34, 36 can be rectangular, circular, oblong, square, and the like. The openings 34, 36 can have any suitable size as well. For example, in those embodiments where the openings 34, 36 are rectangular, one side of the openings 34, 36 can be approximately 12 in to approximately 36 in and another side of the openings 34, 36 can be approximately 4 in to approximately 24 in.

It should be appreciated that the openings 34, 36 can be coextensive with the dimensions of the air filter housing 20. Therefore, any set of two dimensions given for the air filter housing also apply to the openings 34, 36. This means that the openings 34, 36 can have the same size as, for example, the width and depth (or height and width, etc.) of the air filter housing 20.

The area defined by the openings 34, 36 can have any suitable size. In one embodiment, the area of each one of the air inlet opening 34 and the air outlet opening 36 is, independently (meaning one opening 34, 36 can be one size and another opening 34, 36 can be another size), no more than approximately 9 ft$^2$, no more than approximately 6 ft$^2$, no more than approximately 5 ft$^2$, no more than approximately 4 ft$^2$, no more than approximately 3.5 ft$^2$.

In another embodiment, the area of each one of the air inlet opening 34 and the air outlet opening 36 is, independently, approximately 0.5 ft$^2$ to approximately 9 ft$^2$, approximately 0.9 ft$^2$ to approximately 6 ft$^2$, approximately 1 ft$^2$ to approximately 5 ft$^2$, approximately 1.25 ft$^2$ to approximately 4 ft$^2$, or approximately 1.5 ft$^2$ to approximately 3.5 ft$^2$. In another embodiment, the area of each one of the air inlet opening 34 and the air outlet opening 36 is, independently, at least approximately 0.5 ft$^2$, at least approximately 0.9 ft$^2$, at least approximately 1 ft$^2$, at least approximately 1.25 ft$^2$, or at least approximately 1.5 ft$^2$.

It is generally preferable for the openings 34, 36 to be approximately the same size, have the same dimensions, and/or have the same area. It should be appreciated, however, that the openings 34, 36 can be different sizes, have different dimensions, and/or have different areas. If the size of the openings 34, 36 are different, then the velocity of the air flow through the smaller opening will be greater than the velocity through the larger opening. The volume of air is the same through both openings 34, 36.

The filter bays 38 are arranged in a V shape inside the air filter housing 20. The wide side of the V shape extends between and is coupled to the sides 30, 32 near the top 26 of the air filter housing 20. The narrow side of the V shape is where the filter bays 38 converge together near the bottom 28 of the air filter housing 20. Air that enters through the air inlet opening 34 must pass through one of the filter bays 38 to reach the air outlet opening 36.

The filter bays 38 are each positioned in parallel with respect to the flow of air through the air filter housing 20. Positioning the filter bays 38 in parallel in this manner means that air flowing through the air filter housing 20 only passes through one of the filter bays 38. It should be appreciated that in alternative embodiments additional filters can be included in the air filter housing 20 so that the air flows through multiple filter bays and/or air filters before exiting the housing. In this situation, the filter bays and/or air filters are said to be positioned in series because the air must flow through multiple filter bays and/or filters to pass through the air filter housing 20.

The filter bays 38 include 4 filter bays 38a, 38b, 38c, 38d. Filter bays 38a, 38b form the left side of the V shape and filter bays 38c, 38d form the right side of the V shape. The filter bay 38a is positioned above and in line with the filter bay 38b. Likewise, the filter bay 38c is positioned above and in line with the filter bay 38d.

It should be appreciated that any suitable number of filter bays 38 can be used with the air filter housing 20. It is generally preferable to have two filter bays 38 on each side or leg of the V shape. However, it is also possible for each side of the V shape to have a single filter bay 38 or more than two filter bays 38. For example, each side of the V shape could include three or four filter bays 38.

The air filter housing 20 includes a single V shaped arrangement of the filter bays 38. This configuration is advantageous because it makes it possible to fit all the filters 40 in the space defined by conventional ductwork typically used in residential HVAC systems. This makes it easy to connect the ductwork to the air filter housing 20. There is no need to make expensive and time-consuming modifications to the ductwork to adapt it to the air filter housing 20.

The filters 40 can be inserted into and removed from the filter bays 38 through filter bay openings 42a, 42b, 42c, 42d (collectively referred to as filter bay openings 42) in the front side 22 of the air filter housing 20. The filter bay openings 42 are arranged in a V shape that corresponds to the V shape of the filter bays 38. The filters 40 are inserted through one end of the legs of the V shape formed by the filter bays 38 to the other end of the legs of the V shape.

It should be appreciated that the filter bay openings 42 can be any suitable size and/or shape. In general, the filter bay openings 42 should be large enough to allow the filters 40 to pass through the openings 42 into the filter bays 38. Also, for the same reason, the filter bay openings 42 are generally shaped to correspond to the shape of the filters 40. Filter bay openings 42, as shown in the Figs., have a roughly rectangular shape. However, it should be appreciated that the filter bay openings 42 can be other shapes such as oblong and the like.

A door 50 can be coupled to the front side 22 of the air filter housing 20 to cover and seal the filter bay openings 42. The door 50 is configured to move between a closed position where the door covers the filter bay openings 42 and an open position where the door does not cover the filter bay openings 42.

In one embodiment, a gasket or other sealing device can be positioned on the inside surface of the door 50 to provide an airtight seal with the front side 22 of the air filter housing 20. During use, the velocity of the air flowing through the air filter housing 20 produces a negative pressure that biases the door 50 and the gasket against the front side 22 of the air filter housing 22. This produces a good airtight seal between the door 50 and the air filter housing 22.

Figure 11:
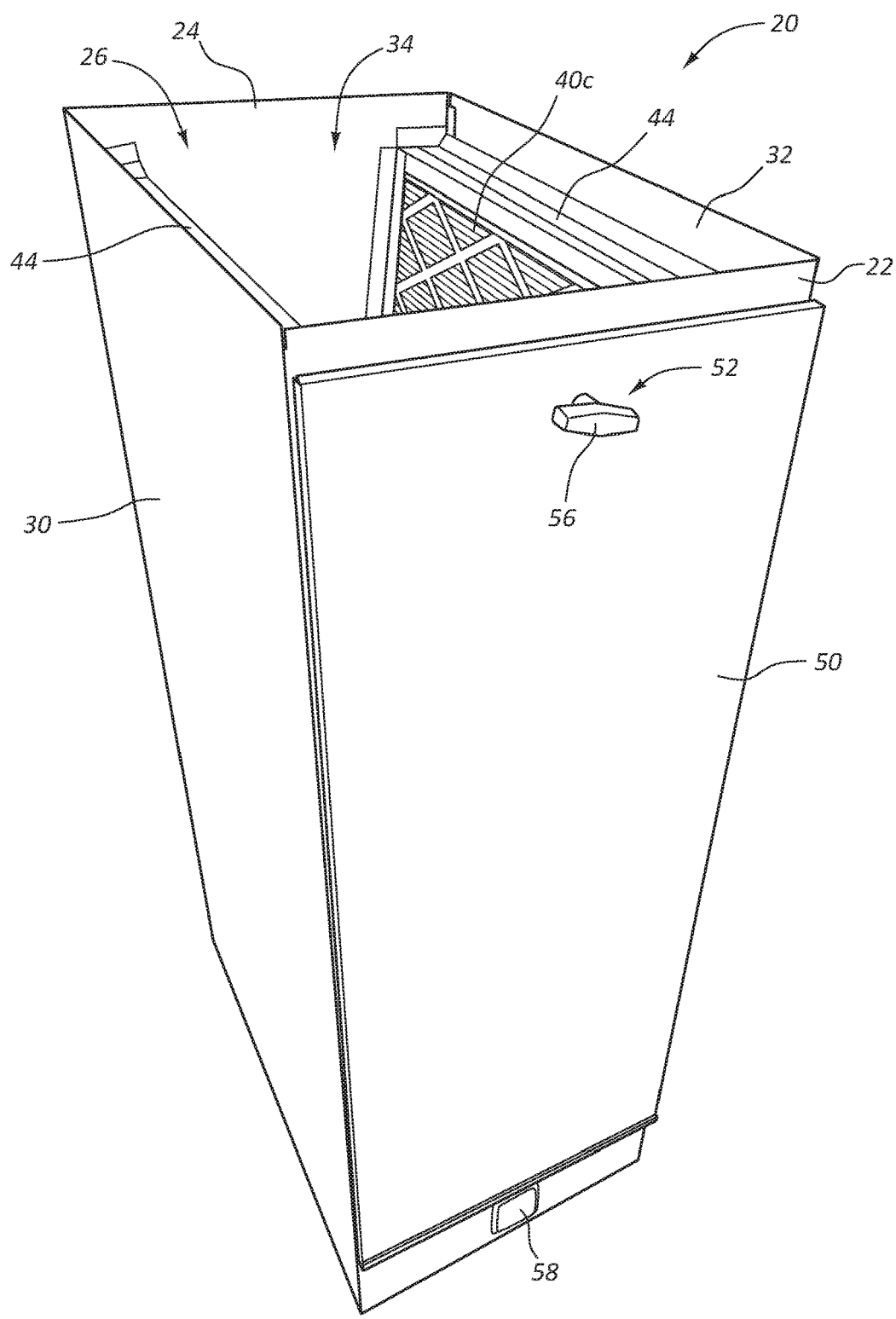
FIGS. 11-12 are left side and right side perspective views, respectively, of the air filter housing in FIG. 7 with a door positioned on the front side.
Figure 12:
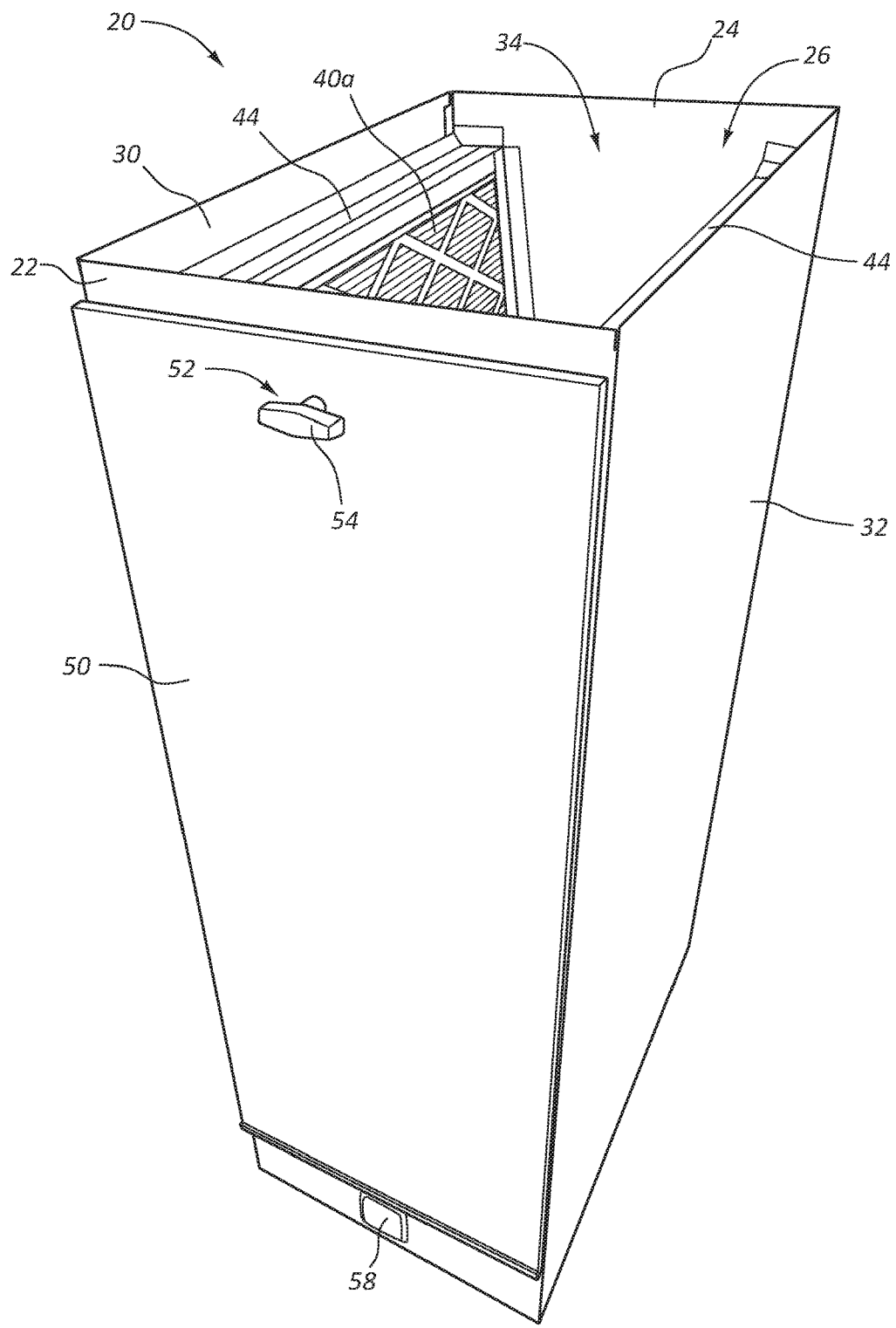

The door 50 can be fastened to the air filter housing 20 in a number of ways and using a number of fasteners. In one embodiment, the door 50 can be coupled to and released from the air filter housing 20 without the use of any tools. For example, the door 50 can be coupled to the air filter housing 20 using a hand operated threaded fastening mechanism 52 as shown in FIGS. 11-12. The threaded fastening mechanism 52 includes a threaded shaft 54 attached to the front side 22 of the air filter housing 20 (e.g., nut and bolt arrangement) and a corresponding threaded knob 56 configured to engage the threaded shaft 54.

The door 50 includes a hole at the top of the door 50 that is sized to receive the threaded shaft 54. The door 50 is attached to the air filter housing 20 by positioning the threaded shaft 54 through the hole and tightening the knob 56 to hold the door 50 in place. The door is removed from the air filter housing 20 by loosening the knob 56 until it comes off of the threaded shaft 54 and then moving the door 50 away from the front side 22 of the air filter housing 20. This method of attaching the door to the air filter housing 20 does not require the user to use any tools. Accordingly, the door 50 is fastened to the air filter housing 20 in a readily releasable manner.

It should be appreciated that the door 50 can be fastened to the front side 22 of the air filter housing 20 using any of a number of fasteners and/or fastening methods such as those described in the Terminology and Interpretative Conventions section below. It is preferable for the door 50 to be coupled to the front side 22 of the air filter housing 20 using a readily releasable fastener or fastening method to allow the user to quickly and easily change the air filters 40.

The air filters 40 are held in the filter bays 38 by filter support frames or filter racks 44. The filter support frames 44 are sized to hold the air filters 40 in position in the filter bays 38. The filter support frames 44 are configured to securely hold three sides of the air filters 40 and be open on a fourth side through which the air filters 40 can be inserted into and removed from the air filter frames 44.

The filter support frames 44 and/or the air filters 40 can be configured to form an airtight seal around the edges of the air filters 40. This is especially desirable for high efficiency filtration applications where the air filter housing 20 has a MERV rating of at least 13. A seal can be formed between the filter support frames 44 and the air filters 40 in a number of ways. For example, in one embodiment, a gasket 46 can be positioned around the edges of the air filters 40. The gasket 46 contacts the interior surfaces of the filter support frames 44 and prevents air from leaking through the area between the filter support frames 44 and the air filters 40.

Each filter support frame 44 includes a support base 48 configured to support a bottom edge of the respective air filter 40. In one embodiment, the top side of the support bases 48 in the filter bays 38a, 38c are configured to support the bottom of the air filters 40a, 40c and the bottom side of the same support bases 48 are configured to hold a top edge of the air filters 40b, 40d. It should be appreciated that numerous other configurations can we use to support the air filters 40.

Each of the filter bays 38 and/or the filter support frames 44 has an open face, which is the open area of the filter bays 38 and/or the filter support frames 44 when the air filters 40 are not present. When the air filters 40 are present the area is no longer open. It is instead closed by the air filters 40 so that air is forced to pass through the air filters as and air passes through the air filter housing 20.

The open face area of the filter bays 38 and/or the filter support frames 44 can be any suitable size. In one embodiment, the total open face area of all the filter bays 38 in the air filter housing 20 or all the filter support frames 44 in the air filter housing is at least approximately 4 ft$^2$, at least approximately 5 ft$^2$, at least approximately 10 ft$^2$, or at least approximately 12 ft$^2$. In another embodiment, the total open face area of all the filter bays 38 in the air filter housing 20 or all the filter support frames 44 in the air filter housing is no more than approximately 40 ft$^2$, no more than approximately 30 ft$^2$, no more than approximately 18 ft$^2$, or no more than approximately 15 ft$^2$. In yet another embodiment, the total open face area of all the filter bays 38 in the air filter housing 20 or all the filter support frames 44 in the air filter housing is approximately 4 ft$^2$ to approximately 40 ft$^2$, approximately 5 ft$^2$ to approximately 30 ft$^2$, approximately 10 ft$^2$ to approximately 18 ft$^2$, or approximately 12 ft$^2$ to approximately 15 ft$^2$.

The air filter housing 20 can also include a pressure gauge 58 configured to measure the pressure drop across the air filters 40. The pressure gauge 58 provides an easy way for the user to determine when the air filters 40 should be changed. The pressure drop across the air filters 40 increases over time as the air filters 40 become loaded with contaminants filtered from the air. The air filters 40 should be changed when the pressure drop across the air filters 40 exceeds a given level. The pressure gauge 58 provides a visual indicator of when the air filters 40 are loaded with contaminants.

The pressure gauge 58 can be configured to display the pressure drop in a number of different formats. For example, in one embodiment, the pressure gauge 58 displays the pressure drop across the air filters 40 numerically. In another embodiment, the pressure gauge 58 displays the pressure drop visually with a needle that moves through green, yellow, and red colors. When the needle is in the green region, the pressure drop is relatively low and within an acceptable operating range. When the needle is in the yellow region, the pressure drop is still within the acceptable operating range but it will exceed the maximum pressure drop soon. When the needle is in the red regions, the pressure drop is too high and the air filters 40 need to be changed.

The air filter housing 20 has a roughly rectangular shape—e.g., a rectangular prism shape or parallelepiped shape. This shape is advantageous because it largely corresponds to the shape of conventional ductwork used in residential HVAC systems. This makes it easy to install in the ductwork of a residential HVAC system.

The air filter housing 20 can be any suitable size. FIG. 1 shows the where the height, width, and depth measurements were taken relative to the air filter housing 20. In one embodiment, the air filter housing 20 has a height of approximately 30 in to approximately 72 in, a width of approximately 12 in to approximately 36 in, and a depth of approximately 4 in to approximately 24 in. In another embodiment, the air filter housing 20 has a height of approximately 36 in to approximately 60 in, a width of approximately 15 in to approximately 30 in, and a depth of approximately 8 in to approximately 20 in. In yet another embodiment, the air filter housing 20 has a height of approximately 42 in to approximately 54 in, a width of approximately 20 in to approximately 26 in, and a depth of approximately 10 in to approximately 18 in. In a preferred embodiment, the air filter housing 20 has a height of approximately 48 in, a width of approximately 25 in, and a depth of approximately 10 in to approximately 18 in.

The air filter housing 20 can have a cross-sectional area that is the same or is similar to the area of the air inlet opening 34 and/or the air outlet opening 36 described above. Therefore, any of the dimensions or areas described in connection with the openings 34, 36 also apply to the cross-sectional dimensions and cross-sectional area of the air filter housing 20.

The air filter housing 20 is configured in a way that provides a relatively large amount of filter area relative to the size of the air filter housing 20. This can be quantified as the ratio of the open-face area of the filter bays 38 to the cross-sectional area of the air filter housing 20. In some embodiments, the ratio of the total open face area of all of the filter bays 38 to the cross-sectional area of the air filter housing 20 can be approximately 0.5 to approximately 80, approximately 0.8 to approximately 30, approximately 2.5 to approximately 15, or approximately 3.4 to approximately 10.

Any suitable air filter 40 can be used in the air filter housing 20. For example, the air filters 40 can be high-efficiency air filters that have a MERV rating of at least 13 or, preferably, at least 16. One advantage of the air filter housing 20 is that it can use filters rated as MERV 13 or higher and maintain a relatively high air flow rate. The life of these filters can be up to 3 years for a system that is not run continuously. Alternatively, the air filters 40 can be conventional standard efficiency air filters that are widely available through home improvement stores and other retail outlets. In one embodiment, the air filters 40 are mechanical air filters that do not produce ozone, operate electrostatically, or require electricity.

The air filters of 40 can have any suitable shape or size. For example the air filters 40 can be approximately 14 in to approximately 22 in long, approximately 19 in to approximately 29 in wide, and no more than 2 in thick. In one embodiment, the air filters 40 are approximately 14.5 in or approximately 19.5 in long, approximately 24.5 in wide, and approximately 2 in thick.

It should be appreciated that the air filters 40 can be described in terms of their nominal size and/or their actual, measured size. For example, an air filter commonly referred to as size 20 in×25 in×2 in has an actual size of 19.5 in×24.5 in×1.75 in. The first set of dimensions refer to the nominal size of the air filter and the second set of dimensions refer to the actual size. The dimensions given for the air filters 40 in this document should be understood as referring to the nominal size and/or the actual size of the air filters 40.

The air filters 40 generally have a planar shape that can fit through the filter bay openings 42 and be held in the filter support frames 44. The air filters 40 can have any suitable filter surface area, which is the area of the filter media through which the air flows. The filter surface area can be the same as the open face area of the filter bays 38 when the filter media is flat and not pleated. However, the filter surface area can be much larger than the open-face area of the filter bays 38 when the filter media is pleated or otherwise shaped in a way that increases the surface area.

In one embodiment, the air filters 40 are pleated air filters that have a substantially greater surface area than the open-face area of the filter bays 38. For example, the total filter surface area of all the air filters 40 in the air filter housing 20 can be at least 100 ft$^2$, at least 125 ft$^2$, at least 150 ft$^2$, at least 170 ft$^2$, at least 190 ft$^2$, or at least 200 ft$^2$. The filter surface area of each air filter 40 is the total filter surface area divided by the number of filters (e.g., total filter surface area/4 air filters).

In one embodiment, the total volume of all the air filters 40 in the air filter housing 20 can be approximately 0.6 ft$^3$ to approximately 5.8 ft$^3$, approximately 0.8 ft$^3$ to approximately 4.4 ft$^3$, approximately 1.5 ft$^3$ to approximately 2.6 ft$^3$, or approximately 1.75 ft$^3$ to approximately 2.2 ft$^3$. In another embodiment, the total volume of all the air filters 40 in the air filter housing 20 can be at least approximately 0.6 ft$^3$, at least approximately 0.8 ft$^3$, at least approximately 1.5 ft$^3$, or at least approximately 1.75 ft$^3$. In another embodiment, the total volume of all the air filters 40 in the air filter housing 20 can be no more than approximately 5.8 ft$^3$, no more than approximately 4.4 ft$^3$, no more than approximately 2.6 ft$^3$, or no more than approximately 2.2 ft$^3$.

It should be appreciated that the air filter housing 20 can be oriented upright (vertically), on its side (horizontally), or rotated any degree from being vertical or horizontal. Likewise, the filter bays 38 can be oriented so that the V shape is pointed in any direction—e.g., pointed up or down when the air filter housing 20 is upright, pointed left or right when the air filter housing 20 is on its side, or pointed upward or downward at any angle relative to vertical or horizontal when the air filter housing 20 is rotated the same amount.

It should also be appreciated that air can be configured to flow in either direction through the air filter housing 20. For example, air can enter the air filter housing 20 on the open side of the V shape of the filter bays 38 or air can enter on the pointed side of the V shape of the filter bays 38. This is the case for any of the orientations of the air filter housing 20 described above.

Figure 13:
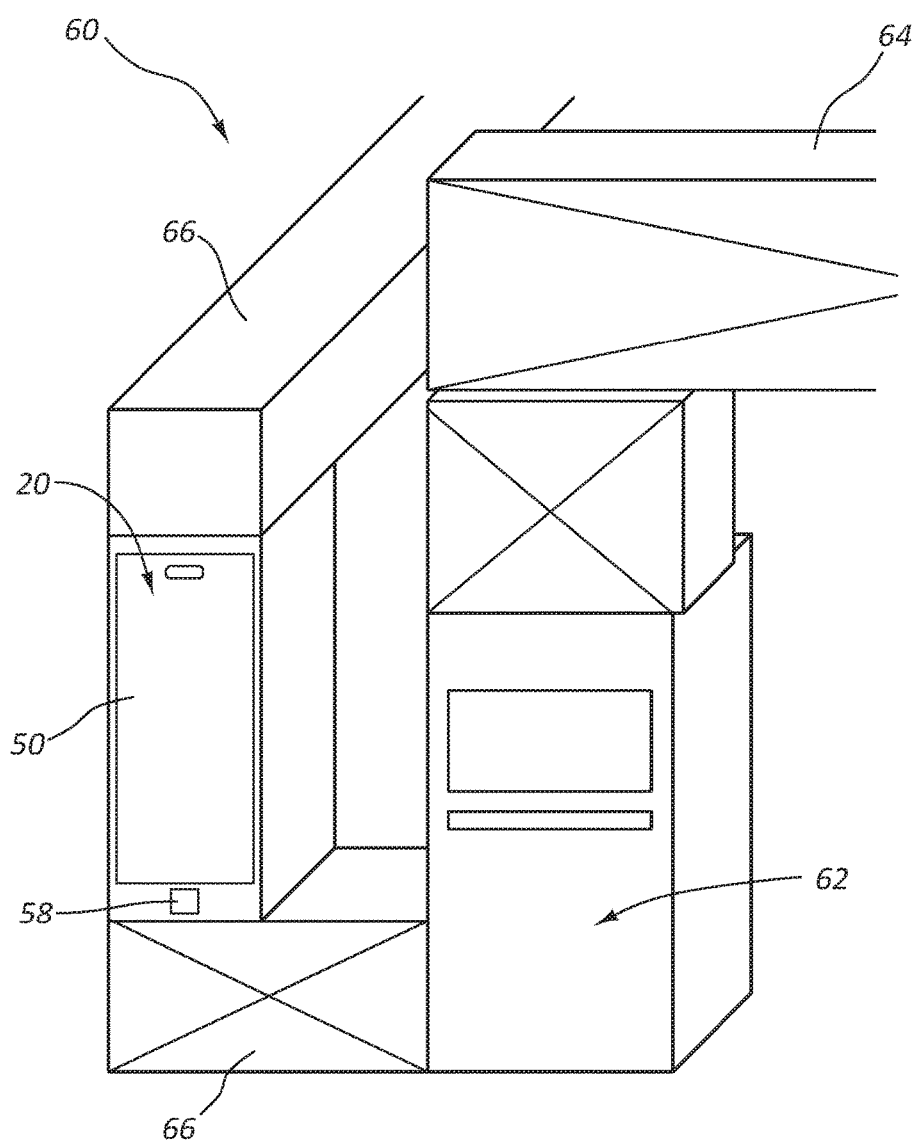
FIG. 13 is a perspective view of one embodiment of an air filtration system including the air filter housing in FIG. 7.

Referring to FIG. 13, an air filtration system 60 includes an air handler 62, supply ductwork 64, and return ductwork 66. The air handler 62 blows air into the supply ductwork 64 which distributes it throughout the residence or structure. The air in the residence is collected and returned to the air handler 62 through the return ductwork 66. The air handler 62 can be an "up-flow" air handler or a "down-flow" air handler.

The air filter housing 20 is coupled to and forms at least a part of the return ductwork 66. The air filter housing 20 is preferably positioned upright in the return ductwork 66 with the air inlet opening 34 positioned on the top and the air outlet opening 36 positioned on the bottom. It should be appreciated, however, that the air filter housing 20 can be positioned in other locations in the air filtration system 60 and in other orientations—e.g., sideways, etc.

In one embodiment, the air filtration system 60 is a residential HVAC system. The HVAC system can include a furnace and/or an air conditioner. The furnace is used to heat the residence and the air conditioner is used to cool the residence. The furnace can be an "up-flow" furnace, "down-flow" furnace, or the like.

In some embodiments, the HVAC system may have an air flow rate that is no more than 2,500 cfm, no more than 2,250 cfm, or no more than 2,000 cfm. If high efficiency air filters 40 are used in the air filter housing 20, then the air filtration system 60 can have a MERV rating of at least 13 or a MERV rating of at least 16.

In those embodiments where the air filtration system 60 has a MERV rating of at least 13 and preferably at least 16, the air flow rate (AF) as a function of the pressure drop (PD) and the pressure drop (PD) as a function of the air flow rate (AF) are given by the following equations, respectively.

$$AF\ (cfm) = 3093 * PD + A \qquad \text{(Equation 1)}$$

$$PD\ (wc) = 0.00032 * AF + B \qquad \text{(Equation 2)}$$

The air flow rate equation applies to pressure drops of 0.14 wc to 0.33 wc where A is at least 275, at least 350, at least 400, at least 450, at least 500, at least 550, or at least 560. The pressure drop equation applies to air flows of 1,000 cfm to 1,600 cfm where B is no more than −0.126, no more than −0.14, no more than −0.15, no more than −0.16, no more than −0.17, or no more than −0.18.

EXAMPLES

The following examples are provided to further illustrate the disclosed subject matter. They should not be used to constrict or limit the scope of the claims in any way.

Example 1

Figure 14:
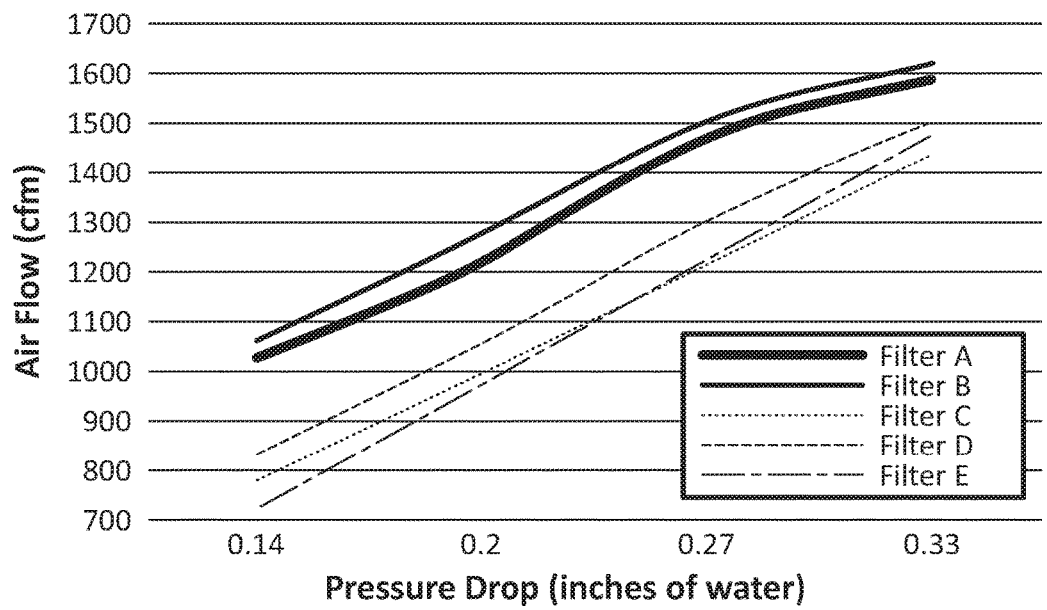
FIG. 14 is a chart showing the air flow rate vs pressure drop of one embodiment of a filtration system including the air filter housing (filtration system A) and four conventional high efficiency filtration systems (filtration systems B-E).

In this Example, the air flow (cfm) and pressure drop of various high efficiency filters were compared. The results of the test are shown in FIG. 14. Filtration system A was the air filtration system shown in FIGS. 1-6 equipped with four 2 in thick (nominal thickness) MERV 16 pleated filters obtained from Columbus Industries, Inc. located in Ashville, Ohio. Filtration system B was the IQ Perfect 16 air filtration system (MERV 16 rated). Filtration system C was the Lennox Healthy Climate MERV 16 air filtration system. Filtration system D was an air filtration system equipped with Filtrete 2400 filters made by 3M. Filtration system E was an air filtration system equipped with Airguard MERV 8 pleated filters.

FIG. 14 is a chart showing the air flow rate (cfm) vs pressure drop (wc) of the filtration systems. The chart was created using data published by the manufacturers of the filtration systems to the extent such data was available. If the manufacturer did not publish the data, then the filtration system was tested to determine the relationship between the air flow rate and the pressure drop.

The chart shows that filtration system A has a relatively high flow rate and low pressure drop. The flow rate at a given pressure drop was higher than all of the other filtration systems except the Perfect 16. However, the Perfect 16 has a dual V-bank filter configuration in a square box that is difficult to incorporate into common residential ductwork. Also, it requires tools to open and change the filters.

A linear regression of the data for filtration system A produced the following equations for the air flow rate (AF) as a function of the pressure drop (PD) and the pressure drop (PD) as a function of the air flow rate (AF). The air flow rate equation applies to pressure drops of 0.14 wc to 0.33 wc and A in the equation is 595. The pressure drop equation applies to air flows of 1,000 cfm to 1,600 cfm and B in the equation is −0.187.

$$AF\ (cfm) = 3093 * PD + A \qquad \text{(Equation 1)}$$

$$PD\ (wc) = 0.00032 * AF + B \qquad \text{(Equation 2)}$$

Example 2

Figure 15:
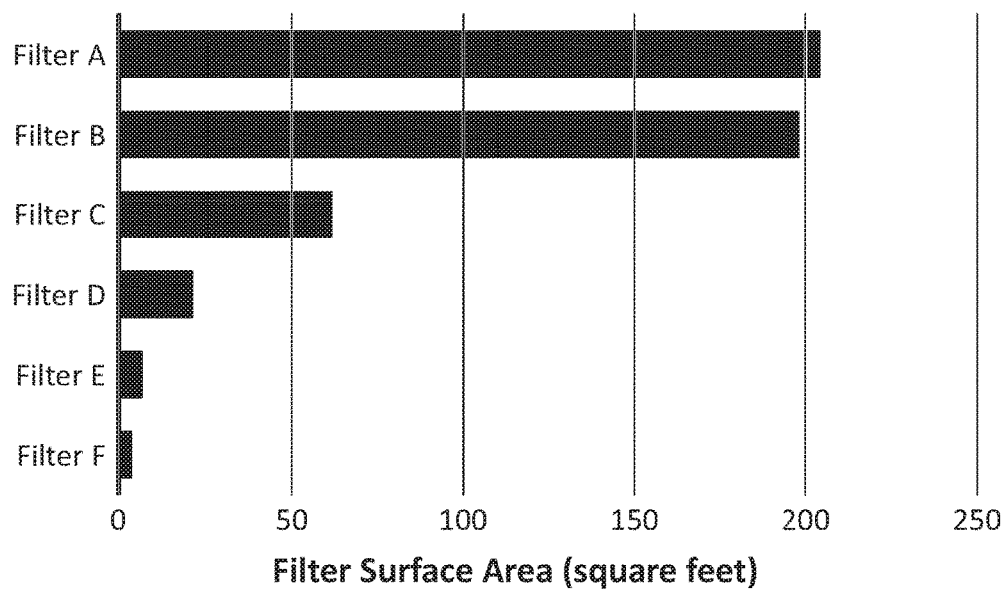
FIG. 15 is a chart showing the filter surface area of the one embodiment of the filtration system including the air filter housing (filtration system A), four conventional high efficiency filtration systems (filtration systems B-E) and one standard HVAC filtration system (filtration system F).

In this Example, the total filter surface area in each Filtration System A-E was graphed in FIG. 15. Filtration system F is a filtration system including a standard HVAC filter. The total filter surface area is the area of all the filter media in each system. The chart was created using filter surface area data provided by the manufacturer to the extent such data was available. If manufacturer data was not available, then the filter surface area was measured by hand.

The chart shows that filtration systems A and B have a much higher filter surface area than the other systems. The higher filter surface area enhances a number of characteristics of the system such as: (a) lowers the pressure drop for a given flow rate (or conversely increases the flow rate for a given pressure drop) and (b) increases the available loading so the filters can function longer before needing to be changed. Filtration systems A and B used pleated filters having a high density of pleats. This significantly increased the filter surface area of the systems.

ILLUSTRATIVE EMBODIMENTS

Reference is made in the following to several illustrative embodiments of the disclosed subject matter. The following embodiments illustrate only a few selected embodiments, which may include one or more of the various features, characteristics, and advantages of the disclosed subject matter. Accordingly, the following embodiments should not be considered as being comprehensive of all possible embodiments.

In one embodiment, an air filter housing comprises an air inlet opening in the air filter housing, an air outlet opening in the air filter housing, and at least four filter bays each of which is configured to receive and hold a separate filter. The air inlet opening and the air outlet opening are in fluid communication with each other. The at least four filter bays form a V shape in the air filter housing. Each side of the V shape includes at least two of the at least four filter bays.

In some embodiments, the air filter housing includes only one V shaped arrangement of filter bays. The at least four filter bays can be positioned to filter air moving through the air filter housing in parallel. The at least four filter bays can be positioned so that air moving from the air inlet opening to the air outlet opening must pass through only one of the at least four filter bays.

In some embodiments, the air filter housing can comprise filter bay openings in the air filter housing. The filter bay openings can form a V shape in the air filter housing that corresponds to the V shape of the at least four filter bays. The filter bay openings can have an elongated shape.

In some embodiments, the air filter housing can comprise filter support frames configured to hold the filters in the at least four filter bays. Each of the filter support frames can include a support base configured to support a bottom edge of the separate filters. The support base of one filter support frame on each side of the V shape supports the bottom edge of at least one of the filters and holds a top edge of another one of the filters.

In some embodiments, the air inlet opening is on a first side of the air filter housing, the air outlet opening is on a second side of the air filter housing, and the at least four filter bays are on a third side of the air filter housing. The first side can be a top side of the air filter housing, the second side can be a bottom side of the air filter housing, and the third side can be a front side of the air filter housing.

In some embodiments, the air filter housing can comprise a door movable between a closed position where the door covers the filter bay openings to the at least four filter bays and an open position where the door does not cover the filter bay openings to the at least four filter bays. The air filter housing can comprise a gasket positioned between the door and a side of the air filter housing when the door is in the closed position. The air filter housing can comprise a pressure drop gauge.

In some embodiments, the air filter housing has a rectangular prism shape. The air filter housing can have a parallelepiped shape. The air filter housing can have a rectangular shape. The air filter housing can have a height of approximately 30 in to approximately 72 in, a width of approximately 12 in to approximately 36 in, and a depth of approximately 4 in to approximately 24 in. The air filter housing can have a cross-sectional area of approximately 0.5 ft² to approximately 9 ft². The total open face area of all the at least four filter bays can be approximately 4 ft² to approximately 40 ft². The ratio of the total open face area of all the at least four filter bays and the cross-sectional area of the air filter housing can be approximately 0.5 to approximately 80.

In some embodiments, the air inlet opening and the air outlet opening can be positioned on opposite sides of the air filter housing. The air inlet opening and the air outlet opening can be rectangular. One side of the air inlet opening and/or the air outlet opening can be approximately 12 in to approximately 36 in and another side of the air inlet opening and/or the air outlet opening can be approximately 4 in to approximately 24 in. An area of the air inlet opening and an area of the air outlet opening can be approximately equal. The air inlet opening and/or the air outlet opening can have an area of approximately 0.5 ft² to approximately 9 ft².

In another embodiment, an air filtration system comprises the air filter housing and a filter positioned in each of the at least four filter bays. Each of the filters can include a gasket around the edges of the filter. The air filtration system can have a MERV rating of at least 13. The air filtration system can have a MERV rating of at least 16. The filters can be pleated filters. The filters can have a planar shape. The total filter surface area of all the filters can be at least 100 ft².

In some embodiments, the air filtration system can have a MERV rating of at least 16 and the air flow rate (AF) through the air filter housing can be at least the value given by the following equation when a pressure drop (PD) is 0.14 wc to 0.33 wc and A is at least 275:

$$AF \text{ (cfm)} = 3093 * PD + A.$$

The air filtration system can have a MERV rating of at least 16 and the pressure drop (PD) in the air filter housing can be no more than the value given by the following equation when an air flow rate (AF) is 1,000 cfm to 1,600 cfm and B is no more than −0.126:

$$PD \text{ (wc)} = 0.00032 * AF + B.$$

In some embodiments, the filters can be approximately 14 in to approximately 22 in long, approximately 19 in to approximately 29 in wide, and no more than 2 in thick. The filters can be approximately 14.5 in or approximately 19.5 in long, approximately 24.5 in wide, and approximately 2 in thick.

In another embodiment, an air filtration system comprises an air handler, supply ductwork coupled to the air handler, and return ductwork coupled to the air handler. The air filter housing can form at least part of the return ductwork. The air filter housing can be positioned upright in the return ductwork and the air inlet opening can be at the top of the air filter housing and the air outlet opening can be at the bottom of the air filter housing. The air filter housing can have a rectangular prism shape. The air filtration system can comprise a furnace including the air handler.

In another embodiment, an air filter housing comprises a top side having an air inlet opening, a bottom side having an air outlet opening, and a front side having at least four filter bays each of which is configured to receive and hold a separate filter. The air inlet opening and the air outlet opening can be in fluid communication with each other. The at least four filter bays can form a V shape in the front side of the air filter housing. Each side of the V shape can include at least two of the at least four filter bays.

Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

The invention claimed is:

1. An air filter housing comprising:
   a first side having an air inlet opening;
   a second side having an air outlet opening, the air inlet opening and the air outlet opening being in fluid communication with each other;
   a front side extending between the first side and the second side; and
   at least four filter bays each of which is configured to receive and hold a separate filter through a filter bay opening in the front side;
   wherein the filter bay openings form a V shape in the front side of the air filter housing; and
   wherein at least two of the at least four filter bays are accessible through each leg of the V shape formed by the filter bay openings in the front side of the air filter housing.

2. The air filter housing of claim 1 wherein the at least four filter bays are arranged in a V shape in the air filter housing.

3. The air filter housing of claim 2 wherein the air filter housing includes only one V shaped arrangement of filter bays.

4. The air filter housing of claim 1 wherein the air filter housing includes only one V shaped arrangement of filter bay openings.

5. The air filter housing of claim 1 comprising filter support frames configured to hold the filters in the at least four filter bays.

6. The air filter housing of claim 5 wherein each of the filter support frames includes a support base configured to support a bottom edge of the filters.

7. The air filter housing of claim 6 wherein the at least four filter bays are arranged in a V shape in the air filter housing, and wherein the support base of one filter support frame on each leg of the V shape formed by the at least four filter bays supports the bottom edge of at least one of the filters and holds a top edge of another one of the filters.

8. The air filter housing of claim 1 comprising a door movable between a closed position where the door covers the filter bay openings and an open position where the door does not cover the filter bay openings.

9. The air filter housing of claim 1 wherein the air filter housing has a rectangular prism shape.

10. The air filter housing of claim 9 wherein the air filter housing has a height of approximately 30 in to approximately 72 in, a width of approximately 12 in to approximately 36 in, and a depth of approximately 4 in to approximately 24 in.

11. An air filtration system comprising:
    the air filter housing of claim 1; and
    a filter positioned in each of the at least four filter bays.

12. The air filtration system of claim 11 wherein the air filtration system has a MERV rating of at least 16.

13. The air filtration system of claim 11 wherein the filters are pleated filters.

14. The air filtration system of claim 11 wherein a total filter surface area of all the filters is at least 100 ft$^2$.

15. The air filtration system of claim 11 wherein the air filtration system has a MERV rating of at least 16 and the air flow rate (AF) through the air filter housing is at least the value given by the following equation when a pressure drop (PD) is 0.14 wc to 0.33 wc and A is at least 275:

$$AF \text{ (cfm)} = 3093 * PD + A.$$

16. The air filtration system of claim 11 wherein the air filtration system has a MERV rating of at least 16 and the pressure drop (PD) in the air filter housing is no more than the value given by the following equation when an air flow rate (AF) is 1,000 cfm to 1,600 cfm and B is no more than 0.126:

$$PD \text{ (wc)} = 0.00032 * AF + B.$$

17. The air filtration system of claim 11 wherein the filters are approximately 14 in to approximately 22 in long, approximately 19 in to approximately 29 in wide, and no more than 2 in thick.

18. The air filtration system of claim 11 wherein the filters are approximately 14.5 in or approximately 19.5 in long, approximately 24.5 in wide, and approximately 2 in thick.

19. An air filtration system comprising:
    an air handler;
    supply ductwork coupled to the air handler; and
    return ductwork coupled to the air handler;
    wherein the air filter housing of claim 1 forms at least part of the return ductwork.

20. The air filtration system of claim 19 wherein the air filter housing is positioned upright in the return ductwork and the air inlet opening is at the top of the air filter housing and the air outlet opening is at the bottom of the air filter housing.

21. The air filter housing of claim 1 wherein each of the at least four filter bays is independently accessible through the filter bay openings in the front side of the air filter housing.

22. The air filter housing of claim 1 wherein the front side includes a front sidewall extending between the first side and the second side, wherein the filter bay openings form a V shape in the front sidewall of the air filter housing.

23. The air filter housing of claim 1 comprising a rear side, wherein each of the at least four filter bays extends lengthwise from the front side of the air filter housing to the rear side of the air filter housing.

* * * * *